United States Patent
Deluga et al.

(10) Patent No.: US 7,535,702 B2
(45) Date of Patent: May 19, 2009

(54) COMPUTER DEVICE WITH UNIVERSAL COVER

(75) Inventors: Ronald E. Deluga, Spring, TX (US); Paul J. Doczy, Cypress, TX (US); Earl W. Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 11/239,835

(22) Filed: Sep. 30, 2005

(65) Prior Publication Data

US 2007/0076360 A1  Apr. 5, 2007

(51) Int. Cl.
*G06F 1/16* (2006.01)
(52) U.S. Cl. ...................................... 361/683
(58) Field of Classification Search ............... 361/683, 361/679
See application file for complete search history.

(56) References Cited

U.S. PATENT DOCUMENTS

| | | | | |
|---|---|---|---|---|
| 5,199,888 | A * | 4/1993 | Condra et al. ............... | 439/142 |
| 5,331,506 | A * | 7/1994 | Nakajima .................... | 361/683 |
| 5,574,625 | A * | 11/1996 | Ohgami et al. .............. | 361/684 |
| 6,625,013 | B2 * | 9/2003 | Minaguchi et al. .......... | 361/683 |
| 6,642,892 | B2 * | 11/2003 | Masaki et al. ............... | 361/683 |
| 6,717,801 | B1 * | 4/2004 | Castell et al. ............... | 361/683 |
| 6,757,160 | B2 * | 6/2004 | Moore et al. ................ | 361/683 |
| 7,106,585 | B2 * | 9/2006 | Lin ............................ | 361/686 |
| 2002/0097561 | A1 * | 7/2002 | Carr ........................... | 361/725 |
| 2003/0048598 | A1 * | 3/2003 | Lee et al. .................... | 361/681 |
| 2007/0076361 | A1 * | 4/2007 | Yin ............................ | 361/683 |

* cited by examiner

*Primary Examiner*—Lisa Lea-Edmonds

(57) ABSTRACT

A computer device comprises at least one housing configured with a peripheral opening to enable access to a plurality of components disposed therein, and a cover couplable to the at least one housing over the peripheral opening to cooperatively enclose the plurality of components.

35 Claims, 4 Drawing Sheets

COMPUTER DEVICE WITH UNIVERSAL COVER

BACKGROUND OF THE INVENTION

Computer devices, such as laptop and/or notebook computers, utilize one or more antennas mounted inside one or more housings of the computer device to facilitate wireless communications. A plastic cover is used to enclose each antenna within each housing to protect the antenna and facilitate installation thereof and/or access thereto (e.g., for repair and/or replacement). However, such covers are difficult to install, difficult to maintain in the assembled position, and difficult to manage. In addition, the size and/or shape of the covers generally change in response to a change to a design and/or layout of the computer device (e.g., computer devices having a different number or size of antennas therein), thereby resulting in additional components to track and/or store.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
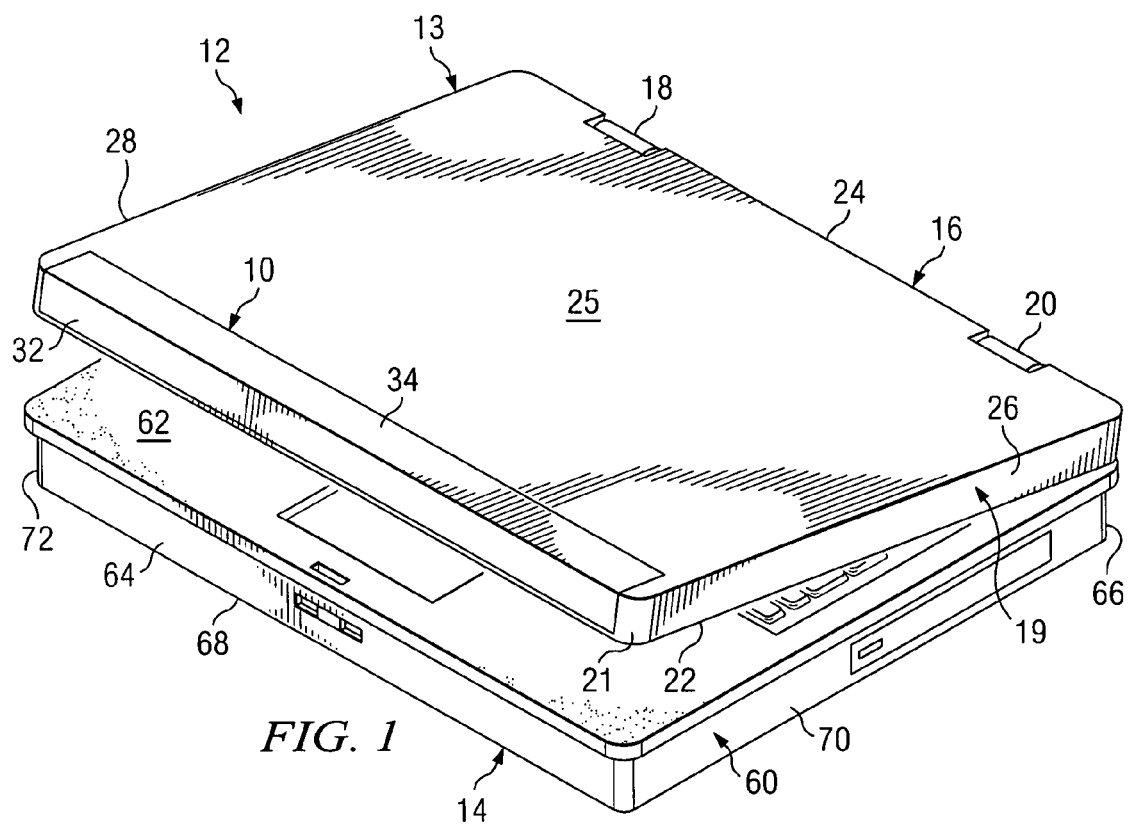
FIG. 1 is a front perspective view of a computer device employing and embodiment of a universal cover to advantage in accordance with the present invention.
Figure 2:
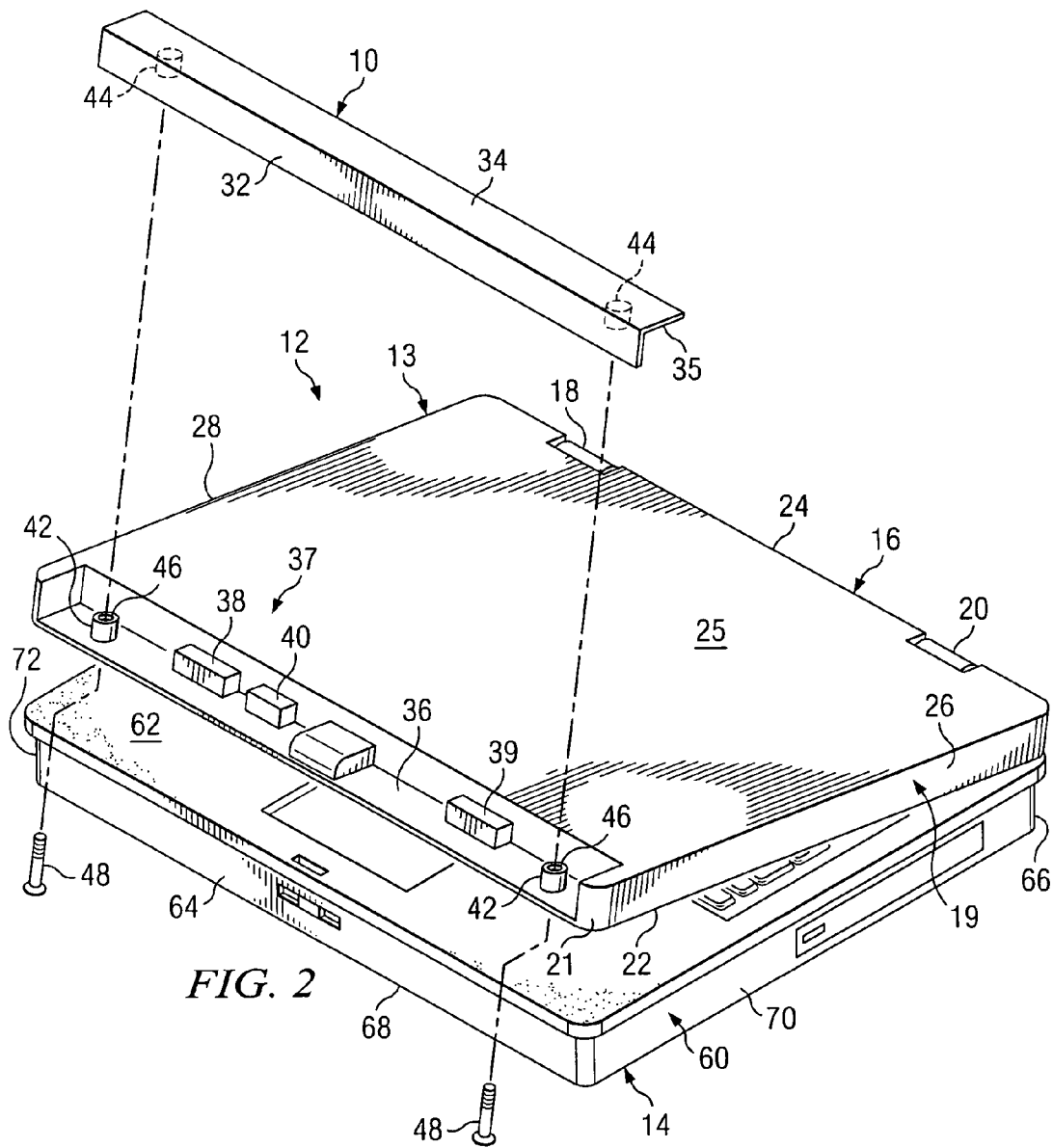
FIG. 2 is an exploded perspective view of the computer device and cover of FIG. 1.
Figure 3:
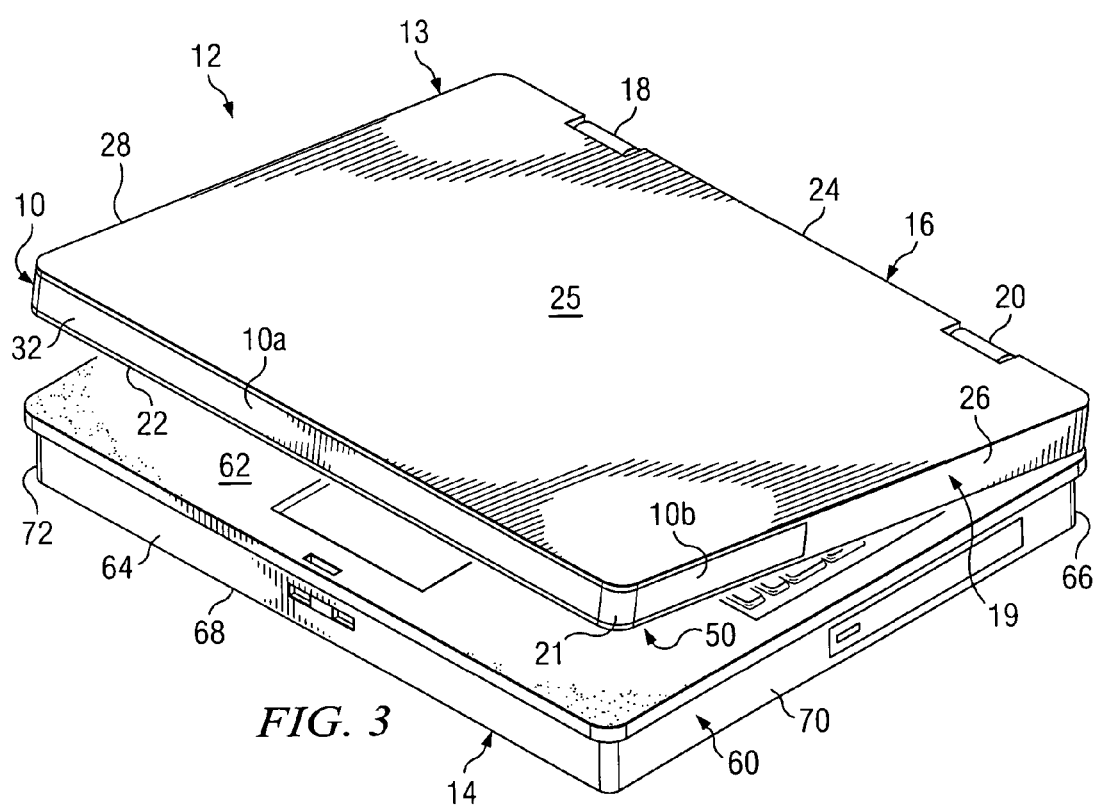
FIG. 3 is a front perspective view of another embodiment of a computer device employing an embodiment of a universal cover to advantage in accordance with the present invention.

The preferred embodiments of the present invention and the advantages thereof are best understood by referring to FIGS. 1-3 of the drawings, like numerals being used for like and corresponding parts of the various drawings.

FIG. 1 is a front perspective view of a computer device 12 employing an embodiment of a universal cover 10 in accordance with the present invention. In the embodiment illustrated in FIG. 1, computer device 12 comprises a notebook or laptop computer 13. However, it should be understood that computer device 12 may comprise other types of computer devices such as, but not limited to, tablet personal computers and handheld computing devices. In the embodiment illustrated in FIG. 1, computer device 12 comprises a base member 14 rotatably coupled to a display member 16 by hinges 18 and 20. Display member 16 comprises a housing 19 having a top surface 21, a front surface 22 (i.e., a surface of display member 16 having a display screen and/or otherwise facing a user when computer device 12 is in an open position), a bottom surface 24, a rear surface 25, and a pair of side surfaces 26 and 28. Base member 14 comprises a housing 60 having a working surface 62, a front surface 64, a rear surface 66, a bottom surface 68, and a pair of side surfaces 70 and 72.

In the embodiment illustrated in FIG. 1, cover 10 is attached to display member 16 along top surface 21 and rear surface 25. However, it should be understood that alternatively or additionally, cover 10 may be attached to surfaces 22, 24, 26 and/or 28, or any combination thereof, or elsewhere either on display member 16 or base member 14 (e.g., on surfaces 62, 64, 66, 68, 70 and/or 72). In the embodiment illustrated in FIG. 1, cover 10 extends an entire width or lateral dimension of display member 16 and comprises portions 32 and 34 adapted to cooperate with and/or otherwise be disposed flush with surfaces 21 and 25 of display member 16, respectively. As used herein, an "entire" dimension shall mean the entire dimension or substantially the entire dimension. Further, as used herein, "flush" shall mean flush (i.e., with even surfaces) or substantially flush. However, it should be understood that cover 10 may be otherwise configured (e.g., a single portion 32 disposed only on top surface 21). In some embodiments of the present invention, cover 10 is preferably constructed and/or otherwise fabricated from a flexible material to facilitate conforming of cover 10 to portions of device 12 (e.g., thickness and/or profile changes and/or extension of cover 10 onto different portions of device 12 (e.g., extending cover from surface 21 onto surface 26). However, it should be understood that cover 10 may also be rigidly configured.

FIG. 2 is an exploded perspective view of computer device 12 and cover 10 of FIG. 1. In the embodiment illustrated in FIG. 2, housing 19 of display member 16 comprises a peripheral opening 36 formed along top surface 21 and rear surface 25 and adapted to receive operational components 37 of device 12 therein. In the embodiment illustrated in FIG. 2, operational components 37 comprise antennas 38, 39 and 40; however, other operational components of computer device 12 may also be disposed within opening 36 including, but not limited to, a power source, a microphone, speakers, light emitting diodes for status indication, etc. Further, it should be understood that, additionally or alternatively, opening 36 may be formed in housing 60 of base member 14. In operation, cover 10 and housing 19, together, cooperatively enclose components 37.

Opening 36 can be formed at any location on display member 16 such as, but not limited to, bottom surface 24, side surfaces 26 and 28, and/or any combination thereof, and/or elsewhere on either display member 16 or base member 14. Additionally, in the embodiment illustrated in FIG. 2, three antennas 38, 39 and 40 are disposed in opening 36; however, it should be understood that a greater or fewer number of antennas 38, 39 and/or 40 may be disposed in opening 36, including antennas of differing sizes and/or shapes. Further, it should be understood that components 37 may be variably positioned within opening 36 without the necessity of re-fabricating and/or redesigning cover 10. Accordingly, cover 10 is adapted to enclose opening 36 to protect antennas 38, 39 and/or 40 and/or any other operational components 37 disposed therein, regardless of the size, shape or position of the components 37 disposed within opening 36 and facilitate easy access to components 37 for installation, repair and/or replacement. Thus, in some embodiments of the present invention, cover 10 is universally configured to accommodate different models of computer devices 12 that may have, for example, a different number, type, location and/or size of antennas 38, 39 and/or 40 or other operational components 37, thereby alleviating a necessity to provide and/or redesign covers for each of such components. In some embodiments of the present invention, cover 10 is universally configured to accommodate different models of computer devices 12 that may have, for example, different types, styles, shapes and/or sizes of housings 19 and/or 60, thereby alleviating a necessity to provide and/or redesign covers for each of such housings. Further, In some embodiments of the present invention, cover 10 is universally configured to accommodate different arrangements of components 37 and/or different combinations of components 37, thereby alleviating a necessity to provide and/or redesign covers for each of such component 37 arrangements or combinations.

In the embodiment illustrated in FIG. 2, a locking mechanism 42 is adapted to releasably secure cover 10 to display member 16. In the embodiment illustrated in FIG. 2, locking mechanism 42 comprises a pair of threaded boreholes 44 disposed on an interior surface 35 of portion 34 of cover 10 and corresponding boreholes 46 disposed on housing 19. In operation, cover 10 is positioned adjacent opening 36 such that boreholes 44 and 46 are coaxially aligned to enable a screw 48 to be inserted through boreholes 46 and into boreholes 44 to attach and lock cover 10 to display member 16. However, it should be understood that other methods for securely fastening cover 10 to display member 16 may be used such as, but not limited to, a snap fit arrangement, to facilitate ready removal of cover 10 from computer device 10 for access to components 17 disposed therein. Further, in some embodiments of the present invention, a hinge assembly may be used to rotatably couple cover 10 to housing 19 and/or 60 (e.g., to enable access to opening 36 without detaching cover 10 from computer device 12).

FIG. 3 is a front perspective view of computer device 12 employing another embodiment of a universal cover 10 in accordance with the present invention. In the embodiment illustrated in FIG. 3, cover 10 comprises a first portion 10a extending along at least a portion of top surface 21 and a second portion 10b being along at least a portion of side surface 26. In some embodiments of the present invention, cover 10 is flexibly configured and/or manufactured to enable "wrapping" of cover 10 from top surface 21 around a corner 50 of display member 16 and onto side surface 26. However, it should also be understood that cover 10 may be rigidly constructed. Further, it should be understood that alternatively or additionally, cover 10 may be attached to any combination of surfaces 21, 22, 24, 25, 26 and 28 and/or elsewhere on display member 16 and/or base member 14.

Figure 4:
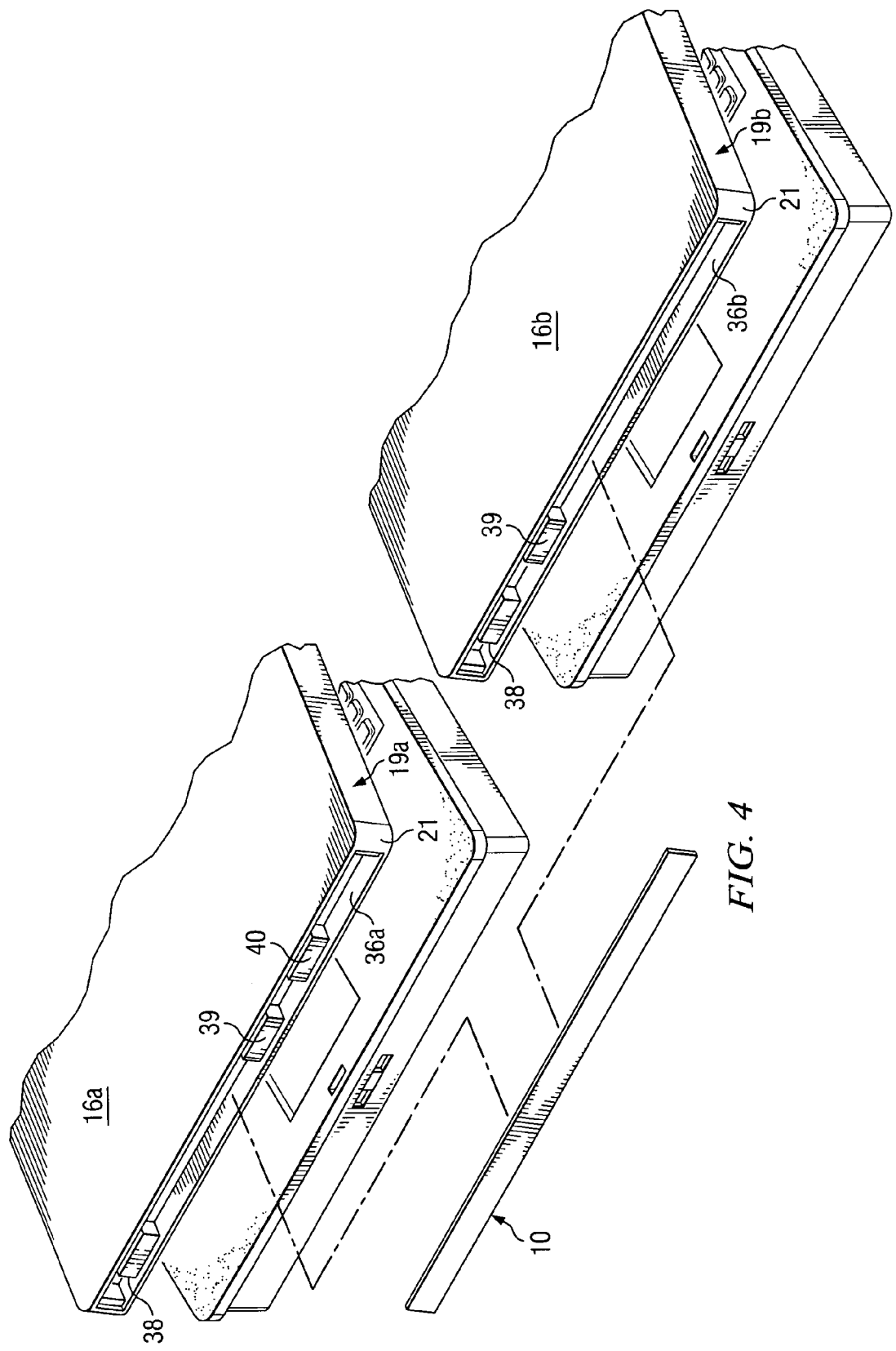
FIG. 4 is a front perspective view of a plurality of display members in accordance with the present invention.

FIG. 4 illustrates is a front perspective view of a plurality of display members 16a and 16b. In the embodiment illustrated in FIG. 4, display members 16a and 16b comprise housings 19a and 19b having peripheral openings 36a and 36b, respectively, formed along top surface 21. In the embodiment illustrated in FIG. 4, peripheral opening 36a is adapted to receive three operational components 38, 39 and 40 and peripheral opening 36b is adapted to receive two operational components 38 and 39 in different locations from those illustrated within opening 36a. In the embodiment illustrated in FIG. 4, cover 10 is exchangeably couplable to housings 19a and 19b to respectively enclose openings 36a or 36b, regardless of the position, size and/or shape of components 38, 39 and/or 40 to enclose components 38, 39 and/or 40. Further, in FIG. 4, housings 19a is illustrated as being the same as housing 19b; however, it should be understood that housings 19a and 19b may be configured differently (e.g., different sizes for different models of computer device 12 and/or different housings for the same computer device 12 (e.g., one housing for the display member and another housing for the base member)).

Thus, embodiments of the present invention enable a variety of sizes, shapes and/or placements of components 37 (e.g., antennas 38, 39 and/or 40) to be enclosed and/or otherwise covered with a single cover. Further, embodiments of the present invention enable a change to a size, shape and/or location of component(s) 17 within opening 36 without necessitating a change to cover 10. Accordingly, when different models of computer device 12 are manufactured (e.g., computer devices 12 having different numbers, sizes locations and/or shapes of antennas 38, 39 or 40), an identical cover 10 can be used to enclose opening 36, thereby facilitating universal adaptability of cover 10 to different models and/or types of computer devices 12. In addition, embodiments of the present invention reduce the number of parts forming computer device 12 and the quantity and corresponding appearance of parting lines on computer device 12.

What is claimed is:

1. A computer device, comprising:
a display member housing rotatably coupled to a base member housing, the display member housing configured with a peripheral opening to enable access to a plurality of components disposed therein; and
a cover couplable to the display member housing over the peripheral opening to cooperatively enclose the plurality of components, wherein the cover is exchangeably couplable between the display member housing of the computer device and another display member housing of another computer device.

2. The computer device of claim 1, wherein the cover couples to different models of computer devices that have a different number, type, location, or size of antennas.

3. The computer device of claim 1, wherein the cover couples to different models of computer devices that have different types, styles, shapes, or sizes of housings.

4. The computer device of claim 1, wherein the cover is flexible.

5. The computer device of claim 1, further comprising a locking mechanism to secure the cover to the display member housing.

6. The computer device of claim 1, wherein at least one of the plurality of components comprises an antenna.

7. The computer device of claim 1, wherein the cover is rotatably coupled to the display member housing.

8. The computer device of claim 1, wherein the cover is removably couplable to the display member housing.

9. A computer device, comprising:
a display member housing means rotatably coupled to a base member housing, the display member housing means configured with a peripheral opening to enable access to a plurality of components disposed therein; and
means couplable to the display member housing means over the peripheral opening for cooperatively enclosing the plurality of components, wherein the means couplable to the display member housing means is exchangeably couplable between the display member housing means of the computer device and another display member housing means of another computer device.

10. The computer device of claim 9, wherein the means couplable to the display member housing means is universally configured to accommodate different arrangements of antennas enclosed in the display member housing means.

11. The computer device of claim 9, wherein the means couplable to the display member housing means extends to at least two surfaces of the display member housing means.

12. The computer device of claim 9, wherein the means couplable to the display member housing means is flexible.

13. The computer device of claim 9, wherein the means couplable to the display member housing means is rotatably coupled to the display member housing means.

14. A method of manufacturing a computer device, comprising:
providing a display member housing rotatably coupled to a base member housing, the display member housing configured with a peripheral opening to enable access to a plurality of components disposed therein; and providing a cover couplable to the display member housing over the peripheral opening to cooperatively enclose the plurality of components, wherein the cover is exchangeably couplable between the display member housing of the computer device and another display member housing of another computer device.

15. The method of claim 14, wherein the cover couples to different models of computer devices that have a different number, type, location, or size of antennas.

16. The method of claim 14, wherein the cover couples to different models of computer devices that have different types, styles, shapes, or sizes of housings.

17. The method of claim 14, wherein providing a cover comprises providing a flexible cover.

18. The method of claim 14, further comprising providing a locking mechanism to removably secure the cover to the display member housing.

19. The method of claim 14, further comprising configuring the cover to extend an entire dimension of at least one surface of the display member housing.

20. The method of claim 14, further comprising rotatably coupling the cover to the display member housing.

21. The method of claim 14, further comprising disposing at least one antenna in the peripheral opening.

22. A computer device, comprising:
a first computer housing having a peripheral opening for disposing a plurality of computer components therein;
a second computer housing having a peripheral opening for disposing a plurality of computer components therein; and
a cover exchangeably couplable between the first and second computer housings to enclose the respective plurality of components.

23. The computer device of claim 22, wherein at least one of the plurality of computer components within the second computer housing is different from at least one of the plurality of computer components within the first computer housing.

24. The computer device of claim 22, wherein the first computer housing is a display member.

25. The computer device of claim 22, wherein the first computer housing is a base member.

26. The computer device of claim 22, wherein the second computer housing is a display member.

27. The computer device of claim 22, wherein the second computer housing is a base member.

28. The computer device of claim 22, wherein the first computer housing is different in style than the second computer housing.

29. The computer device of claim 22, wherein the first computer housing is different in shape than the second computer housing.

30. The computer device of claim 22, wherein the first computer housing is different in size than the second computer housing.

31. A computer device, comprising:
a housing configured with a peripheral opening to enable access to a plurality of antennas disposed therein; and
a cover couplable to the display member housing over the peripheral opening to cooperatively enclose, the plurality of antennas, wherein the cover is exchangeably couplable between the display member housing of the computer device and another display member housing of a different model and type of computer device.

32. The computer device of claim 31, wherein the cover couples to different models of computer devices that have a different number, type, location, or size of antennas.

33. The computer device of claim 31, wherein the cover couples to different models of computer devices that have different types, styles, shapes, or sizes of housings.

34. The computer device of claim 31, wherein the cover is configured to cover different arrangements of antennas.

35. The computer device of claim 31, wherein a selected one of the plurality of antennas is spaced apart from another selected one of the plurality of antennas.

* * * * *

UNITED STATES PATENT AND TRADEMARK OFFICE
CERTIFICATE OF CORRECTION

| | |
|---|---|
| PATENT NO. | : 7,535,702 B2 |
| APPLICATION NO. | : 11/239835 |
| DATED | : May 19, 2009 |
| INVENTOR(S) | : Ronald E. Deluga et al. |

It is certified that error appears in the above-identified patent and that said Letters Patent is hereby corrected as shown below:

In column 3, line 28, delete "being" and insert -- extending --, therefor.

In column 6, line 2, in Claim 24, delete "mcmber" and insert -- member --, therefor.

In column 6, line 22, in Claim 31, after "enclose" delete ".".

Signed and Sealed this

Eighth Day of September, 2009

David J. Kappos
*Director of the United States Patent and Trademark Office*